US009811731B2

(12) United States Patent
Lee et al.

(10) Patent No.: US 9,811,731 B2
(45) Date of Patent: Nov. 7, 2017

(54) DYNAMIC EXTENSION OF MAP DATA FOR OBJECT DETECTION AND TRACKING

(71) Applicant: QUALCOMM Incorporated, San Diego, CA (US)

(72) Inventors: Wonwoo Lee, Vienna (AT); Qi Pan, Vienna (AT); Emilio Maggio, Vienna (AT); Romain Tallonneau, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 14/505,345

(22) Filed: Oct. 2, 2014

(65) Prior Publication Data

US 2015/0098615 A1    Apr. 9, 2015

Related U.S. Application Data

(60) Provisional application No. 61/887,196, filed on Oct. 4, 2013.

(51) Int. Cl.
*G06K 9/00* (2006.01)
*G06K 9/46* (2006.01)
*G06K 9/62* (2006.01)

(52) U.S. Cl.
CPC ..... *G06K 9/00624* (2013.01); *G06K 9/00671* (2013.01); *G06K 9/4604* (2013.01); *G06K 9/6202* (2013.01)

(58) Field of Classification Search
None
See application file for complete search history.

(56) References Cited

U.S. PATENT DOCUMENTS

| 8,649,565 | B1 | 2/2014 | Kim et al. |
| 8,798,357 | B2 * | 8/2014 | Sinha ................. G06K 9/00664 345/419 |
| 9,235,894 | B2 * | 1/2016 | Benhimane .......... G06K 9/6211 |
| 9,269,003 | B2 * | 2/2016 | Schmalstieg ...... G06K 9/00624 |
| 2012/0306847 | A1 | 12/2012 | Lim et al. |
| 2012/0306850 | A1 | 12/2012 | Balan et al. |
| 2014/0010407 | A1 | 1/2014 | Sinha et al. |
| 2015/0098614 | A1 * | 4/2015 | Gee .................... G06K 9/00624 382/103 |
| 2015/0243036 | A1 * | 8/2015 | Hoffmann .............. A61B 3/113 382/103 |

OTHER PUBLICATIONS

Dong et al., "Keyframe-based real-time camera tracking", ICCV 2009.*

(Continued)

*Primary Examiner* — Soo Park

(57) ABSTRACT

A computer-implemented method of tracking a target object in an object recognition system includes acquiring a plurality of images with a camera and simultaneously tracking the target object and dynamically building online map data from the plurality of images. Tracking of the target object is based on the online map data and the offline map data. In one aspect, tracking the target object includes enabling only one of the online map data and offline map data for tracking based on whether tracking is successful. In another aspect, tracking the target object includes fusing the online map data with the offline map data to generate a fused online model.

30 Claims, 10 Drawing Sheets

(56) References Cited

OTHER PUBLICATIONS

Vacchetti et al., "Stable real-time 3D tracking using online and offline information", TPAMI 2004.*

Park et al., "Multiple 3D object tracking for augmented reality", ISMAR 2008.*

Park et al., "Multiple 3D object tracking for augmented reality", IEEE International Symposium on Mixed and Augmented Reality 2008.*

Frese U., et al., "A SLAM Overview from a User's Perspective," 2010, pp. 1-8.

Castle, et al., "Keyframe-based Recognition and Localization during Video-rate Parallel Tracking and Mapping" IVC, 29 (8):524-532, 2011.

International Search Report and Written Opinion—PCT/US2014/059168—ISA/EPO—dated Jan. 20, 2015.

Klein G., et al., "Parallel Tracking and Mapping for Small AR Workspaces", Mixed and Augmented Reality, 2007. ISMAR 2007. 6th IEEE and ACM International Symposium on, 2007, pp. 1-10, XP058033260, DOI: 10.1109/ISMAR.2007.4538852 ISBN: 978-1-4244-1749-0 the whole document.

Reitmayr, et al., "Simultaneous Localization and Mapping for Augmented Reality", International Symposium on Ubiquitous Virtual Reality, 2010, pp. 5-8.

Salas-Moreno, R. F., et al., "SLAM++: Simultaneous Localisation and Mapping at the Level of Objects", IEEE Computer Society Conference on Computer Vision and Pattern Recognition. Proceedings, IEEE Computer Society, US, Jun. 23, 2013 (Jun. 23, 2013), pp. 1352-1359, XP032493104, ISSN: 1063-6919, DOI: 10.1109/CVPR.2013.178 [retrieved on Oct. 2, 2013], the whole document.

Vacchetti L., et al., "Fusing online and offline information for stable 3D tracking in real-time", Proceedings / 2003 IEEE Computer Society Conference on Computer Vision and Pattern Recognition, Jun. 18-20, 2003,Madison, Wisconsin; [Proceedings of the IEEE Computer Conference on Computer Vision and Pattern Recognition], Los Alamitos, Calif. [U .A, vol. 2, Jun. 18, 2003 (Jun. 18, 2003), pp. 241-248, XP010644679, DOI: 10.1109/CVPR.2003.1211476, ISBN: 978-0-7695-1900-5, the whole document.

* cited by examiner

DYNAMIC EXTENSION OF MAP DATA FOR OBJECT DETECTION AND TRACKING

CROSS-REFERENCE TO RELATED APPLICATION

This application claims the benefit of U.S. Provisional Application No. 61/887,196, filed Oct. 4, 2013. U.S. Provisional Application No. 61/887,196 is hereby incorporated by reference.

TECHNICAL FIELD

This disclosure relates generally to computer vision based object recognition applications, and in particular but not exclusively, relates to object detection and tracking in an augmented reality system.

BACKGROUND INFORMATION

A challenge to enabling Augmented Reality (AR) on mobile phones or other mobile platforms is the problem of detecting and tracking objects in real-time. Object detection for AR applications has very demanding requirements: it must deliver full six degrees of freedom, give absolute measurements with respect to a given coordinate system, be very robust and run in real-time. Of interest are methods to compute camera pose using computer vision (CV) based approaches, which rely on first detecting and, subsequently, tracking objects within the camera view. In one aspect, the detection operation includes detecting a set of features contained within the digital image. A feature may refer to a region in the digital image that differs in properties, such as brightness or color, compared to areas surrounding that region. In one aspect, a feature is a region of a digital image in which some properties are constant or vary within a prescribed range of values.

The detected features are then compared to known features contained in a feature database in order to determine whether a real-world object is present in the image. Thus, an important element in the operation of a vision-based AR system is the composition of the feature database. In some systems, the feature database is built pre-runtime by taking multiple sample images of known target objects from a variety of known viewpoints. Features are then extracted from these sample images and added to the feature database.

Recently, augmented reality systems have turned to model-based tracking algorithms or Simultaneous Localization And Mapping (SLAM) algorithms that are based on color or grayscale image data captured by a camera. SLAM algorithms reconstruct three-dimensional (3D) points from incoming image sequences captured by a camera which are used to build a 3D map of a scene (i.e., a SLAM map) in real-time. From the reconstructed map, it is possible to localize a camera's 6DoF (Degree of Freedom) pose in a current image frame.

In some systems SLAM maps of a target object are generated pre-runtime and in close distance from the object. In runtime, the pre-runtime generated SLAM maps of the object are used to estimate 6DoF pose of the camera, relative to the object, from incoming video frames. When SLAM maps built only from the target object are used, tracking of the target object becomes relatively unstable as the distance between the camera and the object increases. This is because there are large scale changes of the imaged object and these scale changes in images causes failure in tracking of points on the object surface because the feature descriptors extracted under such a scale and lighting conditions are quite different from those stored in its previously generated SLAM maps.

Tracking of the target object may also become unstable because of physical changes in the target object that have occurred after the previously SLAM maps were built. Physical changes in the target object may cause descriptor changes of a 3D point during runtime and make it further difficult to detect and/or track the target object.

BRIEF SUMMARY

Accordingly, embodiments discussed herein provide for the extension of online map data by tracking target objects with both online and offline map data. In one aspect, tracking the target object includes enabling only one of the online map data and offline map data for tracking based on, for example, whether tracking of the object is successful. In another aspect, tracking the target object includes fusing online map data with the offline map data to generate a fused online model.

For example, in one embodiment, a computer-implemented method of tracking a target object in an object recognition system includes acquiring a plurality of images with a camera and simultaneously tracking the target object and dynamically building online map data from the plurality of images. The tracking of the target object is based on the online map data and the offline map data.

In another aspect, a computer-readable medium includes program code stored thereon for tracking a target object in an object recognition system. The program code includes instructions to acquire a plurality of images with a camera and to simultaneously track the target object and dynamically build online map data from the plurality of images. The tracking of the target object is based on the online map data and the offline map data.

In yet another aspect, an apparatus includes memory adapted to store program code for tracking a target object in an object recognition system. The apparatus also includes a processing unit adapted to access and execute instructions included in the program code. When the instructions are executed by the processing unit, the processing unit directs the apparatus to acquire a plurality of images with a camera and to simultaneously track the target object and dynamically build online map data from the plurality of images. The instructions further direct the apparatus to track the target object based on the online map data and the offline map data.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
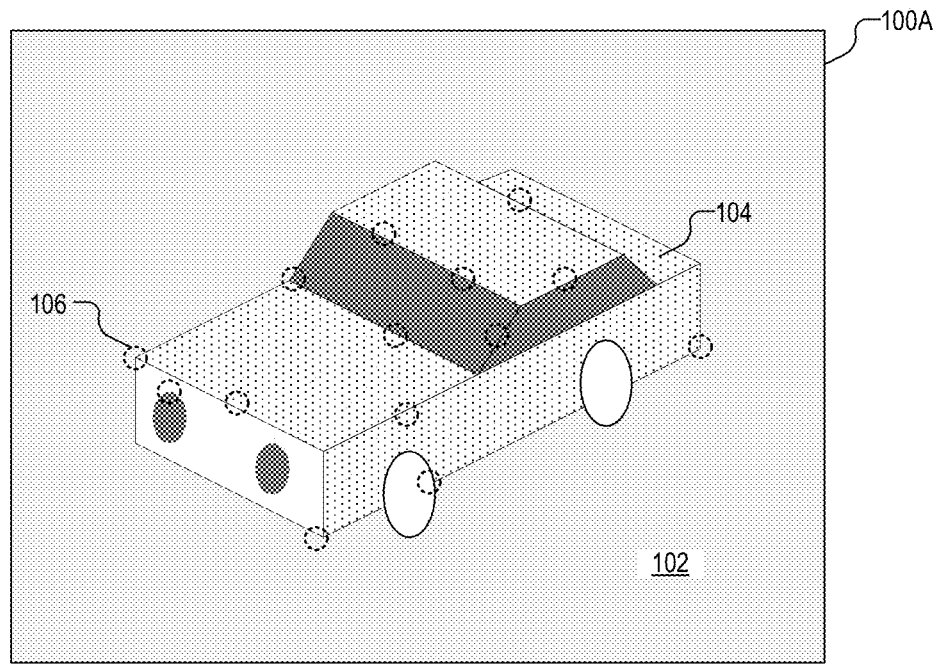
FIGS. 1A and 1B illustrate images of a scene including a target object at differing distances.

Reference throughout this specification to "one embodiment", "an embodiment", "one example", or "an example" means that a particular feature, structure, or characteristic described in connection with the embodiment or example is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Any example or embodiment described herein is not to be construed as preferred or advantageous over other examples or embodiments.

In one aspect, tracking a target object includes extending offline map data of a target object to include map data of the surrounding environment (e.g., online map data). This allows detection and tracking to become robust, especially in scene scale changes. Online map extension builds a map of the current environment where the object is placed, such that the detection and tracking becomes robust to background changes. For example, detection of a small object is challenging in a cluttered scene, but online map extension strategy can cope with this situation by handling clutters as a part of a SLAM map.

The adaptive selection of online/offline SLAM map data may improve performance of a device implementing these procedures. For example, the SLAM map data of the object is barely useful when the camera is far from the object, and vice versa. By turning on/off the offline and online SLAM maps adaptively, computational cost required for detection and tracking can be saved. In one example, this can lead to longer battery life on mobile platforms.

In another aspect, tracking of the target object includes building online model after object detection and fusing the pre-existing offline model with the newly created online model. For example, appearance of the existing target object may be extracted (i.e., at runtime) in order to update the offline model. In addition, model information may be newly available under the conditions at runtime, which are then added to the online map data. The proposed method provides improved robustness to changes in the target's shape and appearance, such as may happen under differing lighting conditions.

In one embodiment, SLAM map data includes map features and keyframe images, where each feature includes a keypoint location and at least one corresponding descriptors of that location. Map features may include features extracted from the surface of a target object (e.g, 2D/3D points, edges, blobs, etc). Keyframe images may include images of a target object, from which the map features are extracted. For example, 3D points can be reconstructed by triangulation among keyframes where the point is visible. Descriptors of map features are extracted from keyframes where the map point is observed (e.g., image patch descriptors and line descriptors).

In one example, a SLAM map of a target object is generated offline and is thus referred to herein as "offline map data", whose keyframes are generated from close-distance from the object. The offline map data is considered as 'good' enough to perform detection and tracking of the target. When a user start interactions with a target object, its offline map data is loaded to an augmented reality application and the target object is detected and tracked from the camera images. The offline map data is marked as 'offline' in the application.

Figure 1B:
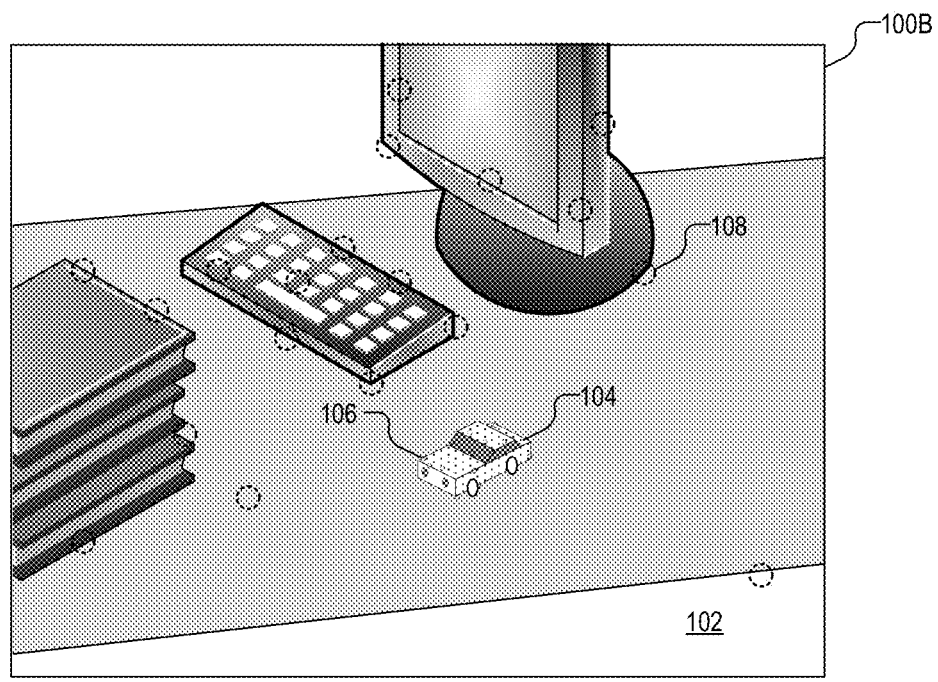

Once the target object is detected from camera video frames, it is tracked and the camera's 6 DoF pose is obtained in real-time. FIG. 1A illustrates an acquired image 100A of a scene 102 including a target object 104 (e.g., toy car) at a close distance having features 106. Thus, target object 104 assumes a large portion of the camera image 100A and tracking will typically work fine. However, as the camera moves away from the target object 104 as depicted in FIG. 1B, the scale of the target 104 in image 100B becomes small soon. As the object scale becomes small in camera images, tracking is more likely to fail and have more jitter. Furthermore, lighting conditions may have changed or target object 104 may have slightly changed shape since the creation of the offline map data.

Accordingly, embodiments disclosed herein overcome this limitation in detection and tracking, by extending the SLAM map data of the target object while a user moves the camera around the object. As keyframes of the environment are added to the SLAM map data, detection and tracking becomes robust and stable, as tracking of the target object may be based on both online and offline map data.

Figure 1C:
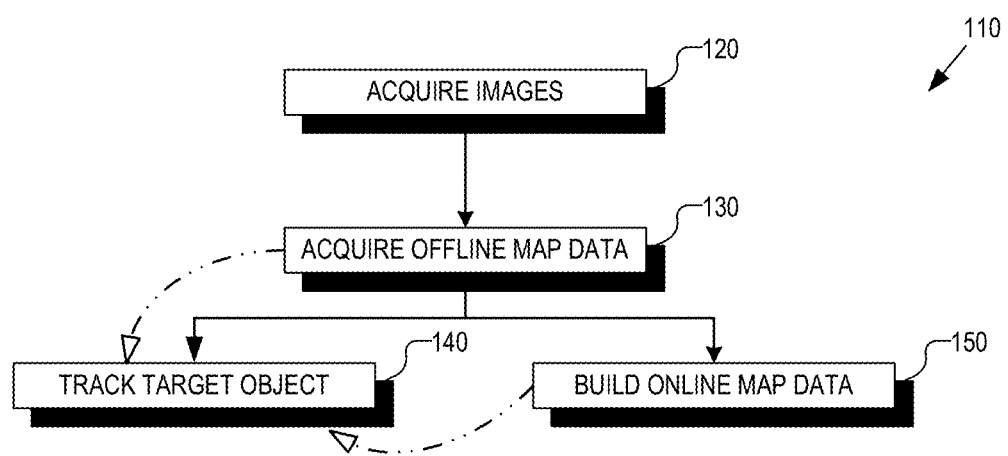
FIG. 1C is a flowchart illustrating a process of tracking a target object based on online and offline map data.

For example, FIG. 1C is a flowchart illustrating a process 110 of tracking a target object based on online and offline map data. In process block 120, a several images of a scene including a target object are acquired. Also acquired, in process block 130, is offline map data. As mentioned above, offline map data may include previously generated SLAM map data of the target object (e.g., prior to runtime). In one embodiment, the target object may be detected based on comparison of features extracted from the acquired images with those features contained in the offline map data. Once the object is detected, process 110 may include the simultaneous tracking (140) of the target object and the building (150) of online map data. As shown in FIG. 1C, the tracking of the target object is based on the acquired offline map data and the dynamically built online map data. As will be discussed in more detail below, some embodiments include adaptively selecting between online and offline map data to perform the object tracking. However, other embodiments include fusing the online map data with the offline map data to generate a fused online model of the target object.

When a user moves the camera around the object and its environment, new keyframes are added to the map data. Conventional SLAM frameworks add a keyframe by comparing the pose of a candidate keyframe (i.e., current camera image) with those of existing keyframes. If the pose of a candidate keyframe is similar to one of existing keyframes' it is ignored. In this way, a conventional SLAM framework avoids creating too many duplicated keyframes, which have close viewpoints. However, this conventional scheme prevents adding online keyframes and makes it difficult to extend the offline map quickly.

Figure 2:
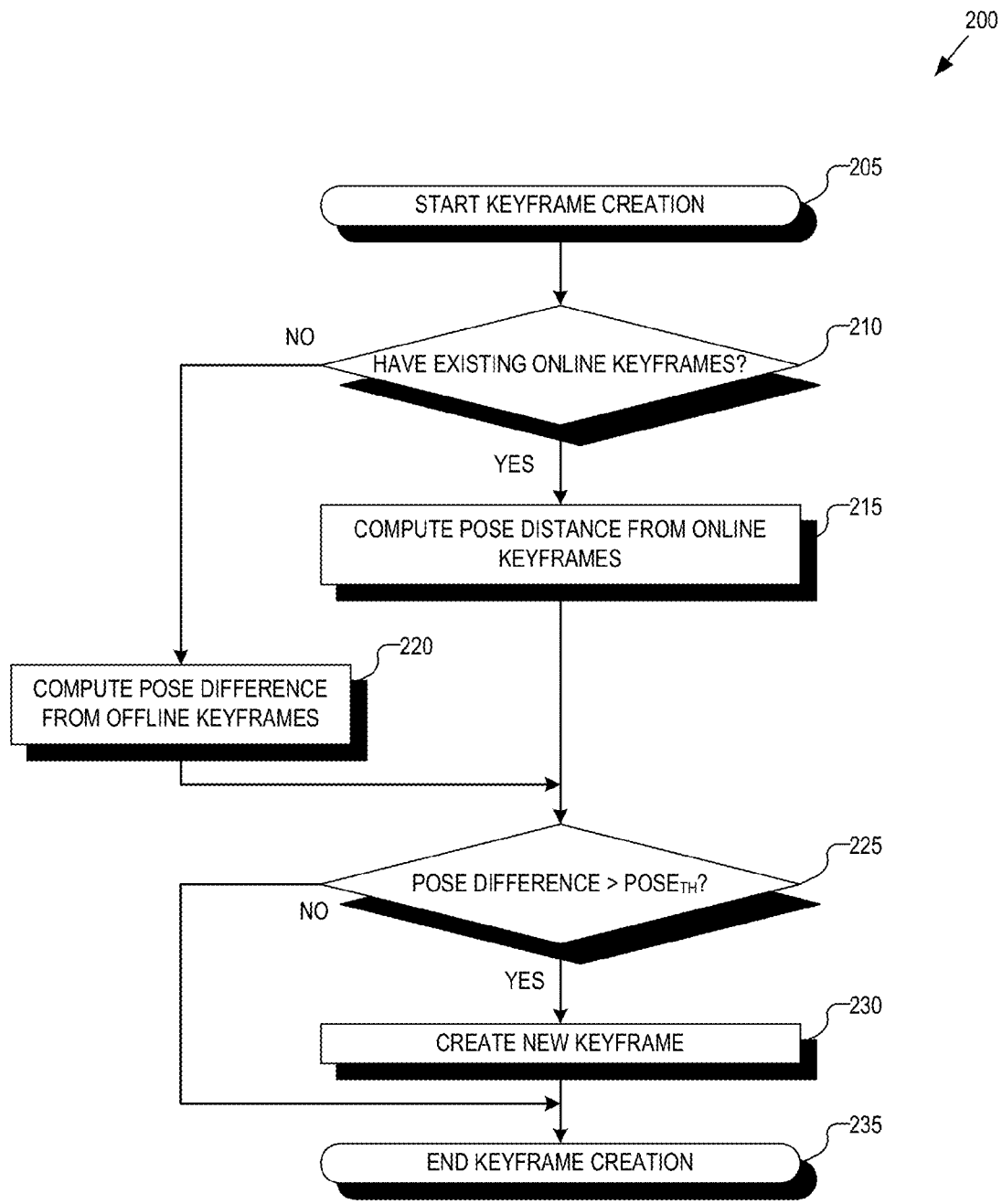
FIG. 2 is a flowchart illustrating a process of building online map data.

Some embodiments of the present disclosure address this problem by skipping the offline keyframes in pose comparison step when adding online keyframes. Only online keyframes are considered in this pose comparison when extending the offline map. If the first online keyframe is about to be added, there is no online keyframes to compare with. In this case, pose differences from all offline keyframes are computed and the maximum is used as a pose difference measurement. In one embodiment, offline keyframes are discarded after creation and only a map of 3D points and associated descriptors are kept. Thus, continuing with this example, online map building may begin without any offline keyframes and a process of online map building would begin with automatically accepting the first online keyframe and adding it to the environment map data. FIG. 2 is a flowchart illustrating another example process 200 of building online map data.

Keyframe creation begins in process block 205. If there are existing online keyframes included in the online map data then process 200 proceeds to process block 220 where a pose difference is computed using the offline keyframes. If, however, in decision block 210 it is determined that there are indeed existing online keyframes, then process block 215 includes computing the pose distance from only the online keyframes. In decision block 225, the calculated pose difference is compared against a pose threshold POSETH to determine whether the pose difference is large enough. If so, a new keyframe is created in the online map data (i.e., process block 230). If the pose difference is not large enough, process 200 proceeds to process block 235 where keyframe creation is ended. Process 200 may be repeated for one or more of the captured images as the camera is move about a scene.

When a new keyframe is added to the existing map data, the coordinates of all map features and 6 DoF poses of all keyframes are updated in a SLAM framework to globally optimize the map data. Thus, when a keyframe is added, the map features on the object surface are changed slightly depending on the optimization results. This strategy is useful to improve the map's quality in a global manner. However, modifying offline map data is not desirable in current embodiments, because it may degrade the quality of detection and tracking of a target in a close distance. To prevent this, embodiments disclosed herein set the offline map data as 'constant' and do not update the offline map data in the map extension process 200.

Once the system has both offline and online map data, using both maps simultaneously for detection and tracking may become inefficient. If the camera is far from the object, tracking map features on the object's surface is not useful due to small scale of the object in the camera image (e.g., see FIG. 1B). On the other hand, if the camera is close to the object, online map data barely helps tracking because most of map points belonging the online map are out of the camera's view (e.g., see FIG. 1A).

Figure 3:
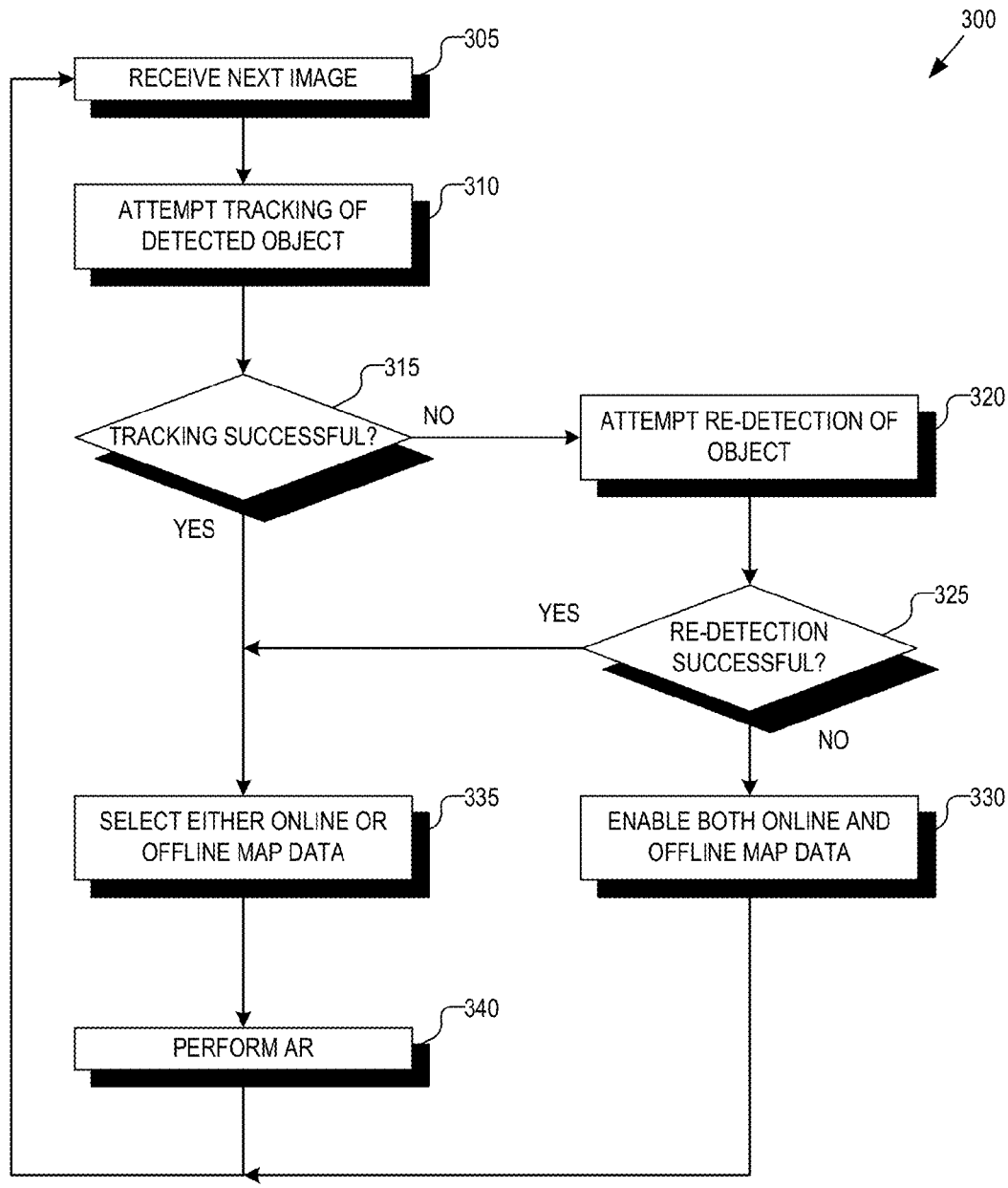
FIG. 3 is a flowchart illustrating a process of tracking and detecting a target object in a scene.

Thus, to perform detection and tracking in an efficient way, embodiments of the present disclosure may adaptively select online and offline map data depending on the scale of the object in the camera's image. FIG. 3 is a flowchart illustrating a process 300 of tracking and re-detecting a target object in a scene. Process 300 is one possible implementation of process block 140 of FIG. 1C. Process 300 begins at process block 305 where a target object has already been detected and tracking is being implemented. Thus, a next image is received in process block 305. Next, in process block 310, an object tracker (e.g., tracking algorithm) may attempt to track the detected object by estimating the target pose. Estimating of the target pose may be successful or unsuccessful. If the pose estimation is unsuccessful, then tracking of the target object fails. If tracking is not successful, then process 300 proceeds to process block 320 where an object detector (e.g., detection algorithm) attempts to re-initialize (i.e., re-detect the target object). If re-detection is not successful, then process 300 advances to process block 330 where both online and offline map data are enabled since camera pose with respect to the target object cannot be determined.

If, however, in decision block 315 tracking was successful, or if in decision block 325 re-detection was successful, then process 300 proceeds to process block 335 where only one of the online or offline map data is selected. Process block 335 will be discussed in more detail below with reference to FIG. 4, but may include computing the scale of the target object in order to determine which map data to use for the next image frame. In process block 340, other jobs are performed based on the results of the determined camera pose (e.g., augmented reality functions).

Figure 4:
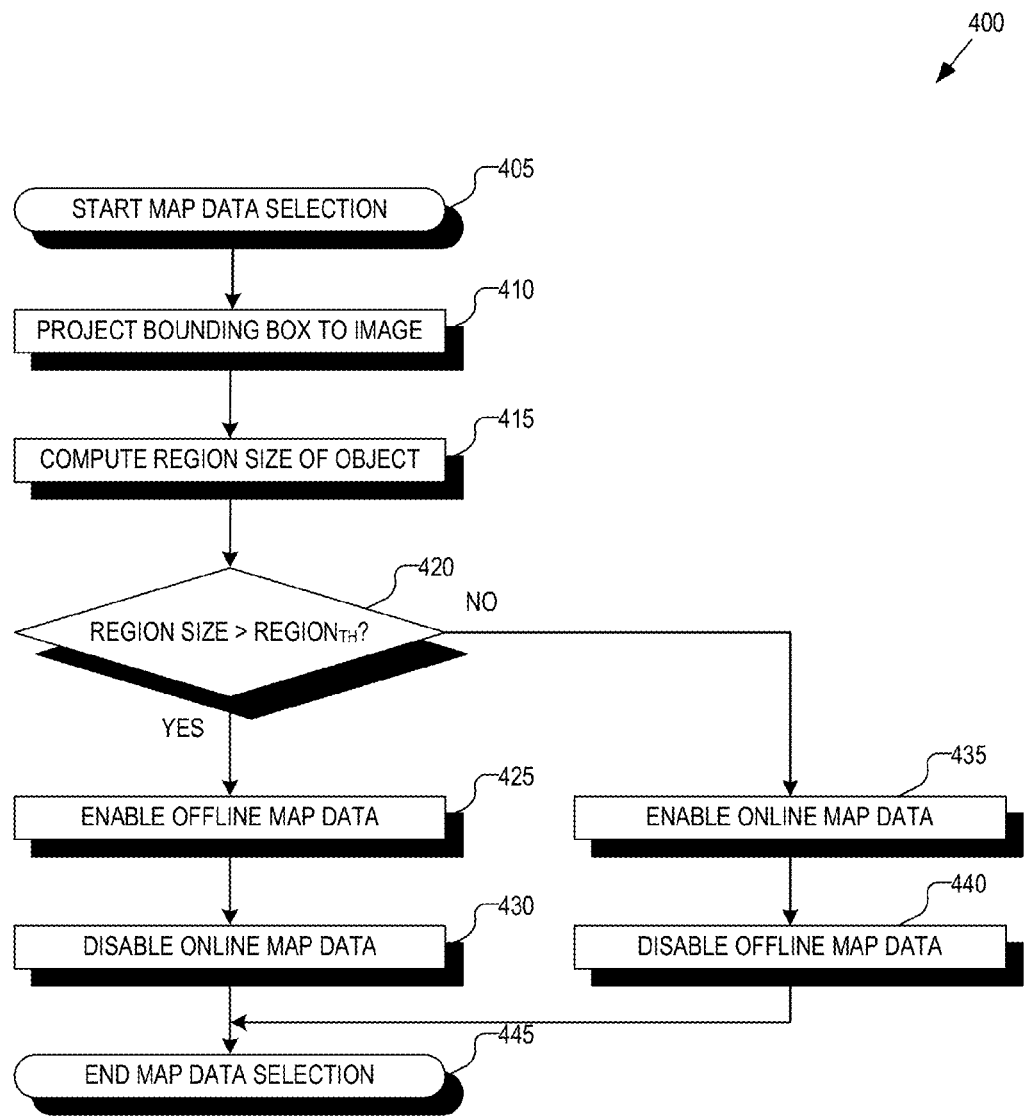
FIG. 4 is a flowchart illustrating a process of selecting between online and offline map data.

FIG. 4 is a flowchart illustrating a process 400 of selecting between online and offline map data. Process 400 is one possible implementation of process block 335 of FIG. 3. Process 400 is but one example of measuring the object scale and includes process block 410 of projecting a bounding box of the offline map features included in the acquired image. Next, in process block 415 a region size of the object is computed based on the projected bounding box. If, in decision block 420, the size of the region is large enough, e.g., greater than a region size threshold $REGION_{TH}$, then process blocks 425 and 430 enable the offline data and disable the online map data. In one embodiment the region size threshold $REGION_{TH}$ corresponds to the target object assuming at least half of the image. If the region size is not big enough, corresponding to a small target object relative to the image, then process 400 proceeds to process blocks 435 and 440 where online map data is enabled, and offline map data is disabled. Accordingly, if the region size is large enough then only offline map data is enabled and similarly, if the region size is not large enough then only online map data is enabled.

Figure 5:
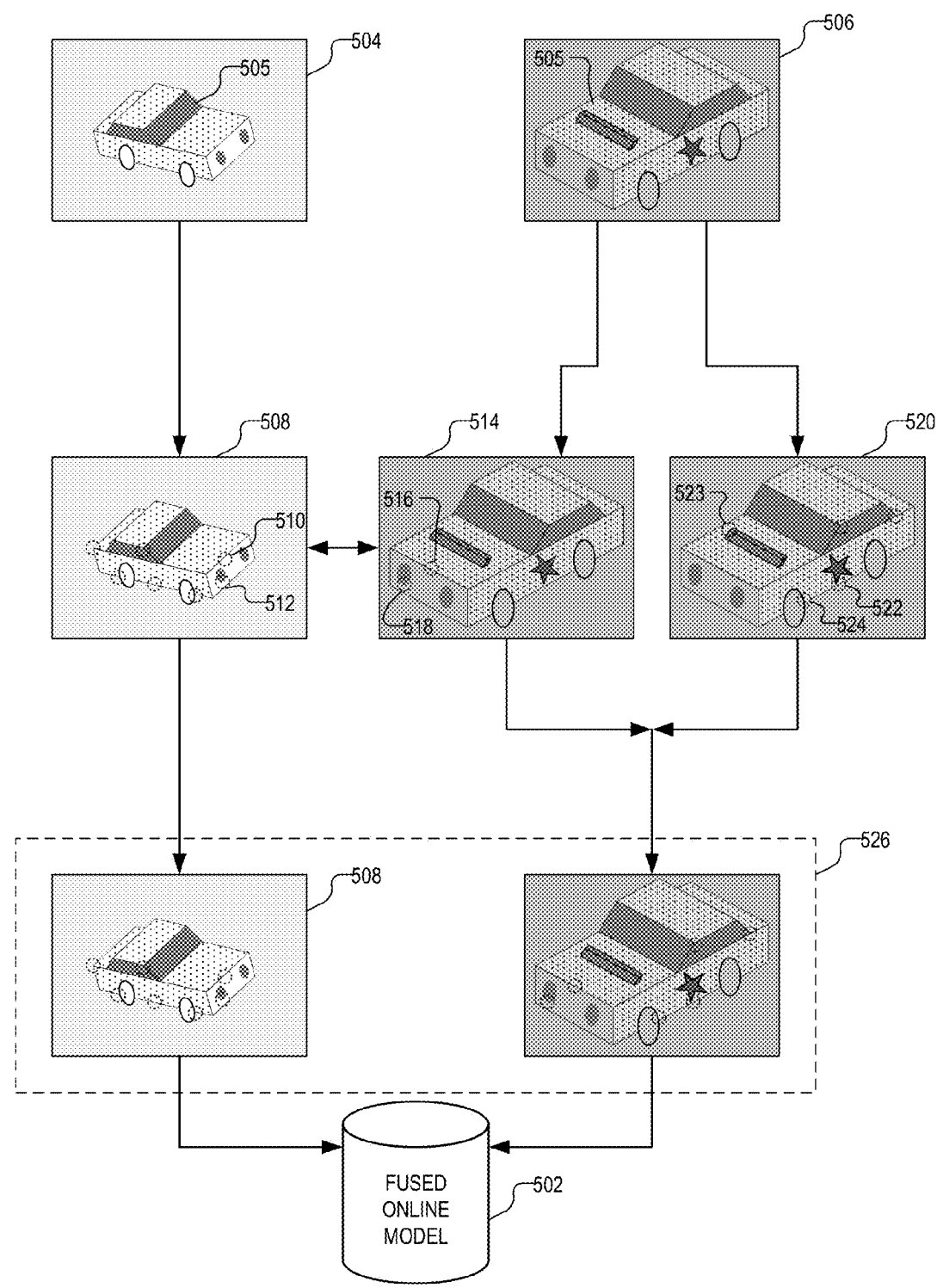
FIG. 5 is a diagram illustrating the fusing of online and offline map data.

FIG. 5 is a diagram illustrating the fusing of online and offline map data to generate a fused online model 502. Image 504 illustrates the appearance of a target object 505 at the time of creating offline map data, while image 506 illustrates the appearance of the same target object 505, except now at runtime. As can be seen by comparison of image 504 with image 506, at runtime, target object 505 may have a different appearance, due to differing lighting conditions, viewing distance, viewing angle, and/or due to a physical change in the target object (e.g., bonnet/hood modification to car). Prior to runtime, offline map data of the target object is created, as represented by image 508. As shown in image 508, various features (e.g., 510 and 512) may be extracted from the pre-runtime image 504 and added to the offline map data. A feature may refer to a region in the digital image that differs in properties, such as brightness or color, compared to areas surrounding that region. In one aspect, a feature is a region of a digital image in which some properties are constant or vary within a prescribed range of values. In one embodiment, a feature may include a point of interest (e.g., "location" or "keypoint") and a description (e.g., "descriptor") of the region surrounding the interest point. Thus, offline map data 508 includes multiple features, that each include a location (e.g., in 3D space) and a descriptor of that feature.

During runtime, newly acquired image 506 may be used to dynamically extract features corresponding to the target object 505. As shown in images 514 and 520, various features including features 516, 518, 522, 523 and 524 are extracted from the image obtained at runtime. Some features extracted from image 506 may correspond with features already contained in the offline map data 508. For example, image 514 illustrates extracted features 516 and 518, which correspond with previously extracted features 510 and 512, respectively. However, features 516 and 518 may have updated descriptors due to a differing appearance of the target object. As will be discussed in more detail below, embodiments discussed herein may update the offline features with the updated descriptors and then use those updated offline features to generate the fused online model 502.

While some features extracted from image 506 may correspond with features already contained in the offline map data 508, other extracted features may be newly detected features (e.g., due to new viewing angle, new lighting conditions, physical shape changes, etc.). By way of example, features 522, 523, and 524 of image 520 illustrate previously undetected features of the target object 505. These features may have been previously undetected either because of a change in the physical shape, color, or texture of target object 505, a change in lighting conditions, and/or a change in the viewing angle/distance. Regardless, embodiments discussed herein may add the newly detected features when generating the fused online model 502. Block 526 illustrates the merging of offline map data 508 with the online map data that includes both offline features updated with new appearance information (i.e., descriptors) and also newly detected features. Offline map data 508 is fused with the online map data in order to generate the fused online model 502, which may then be subsequently used for object tracking.

Figure 6:
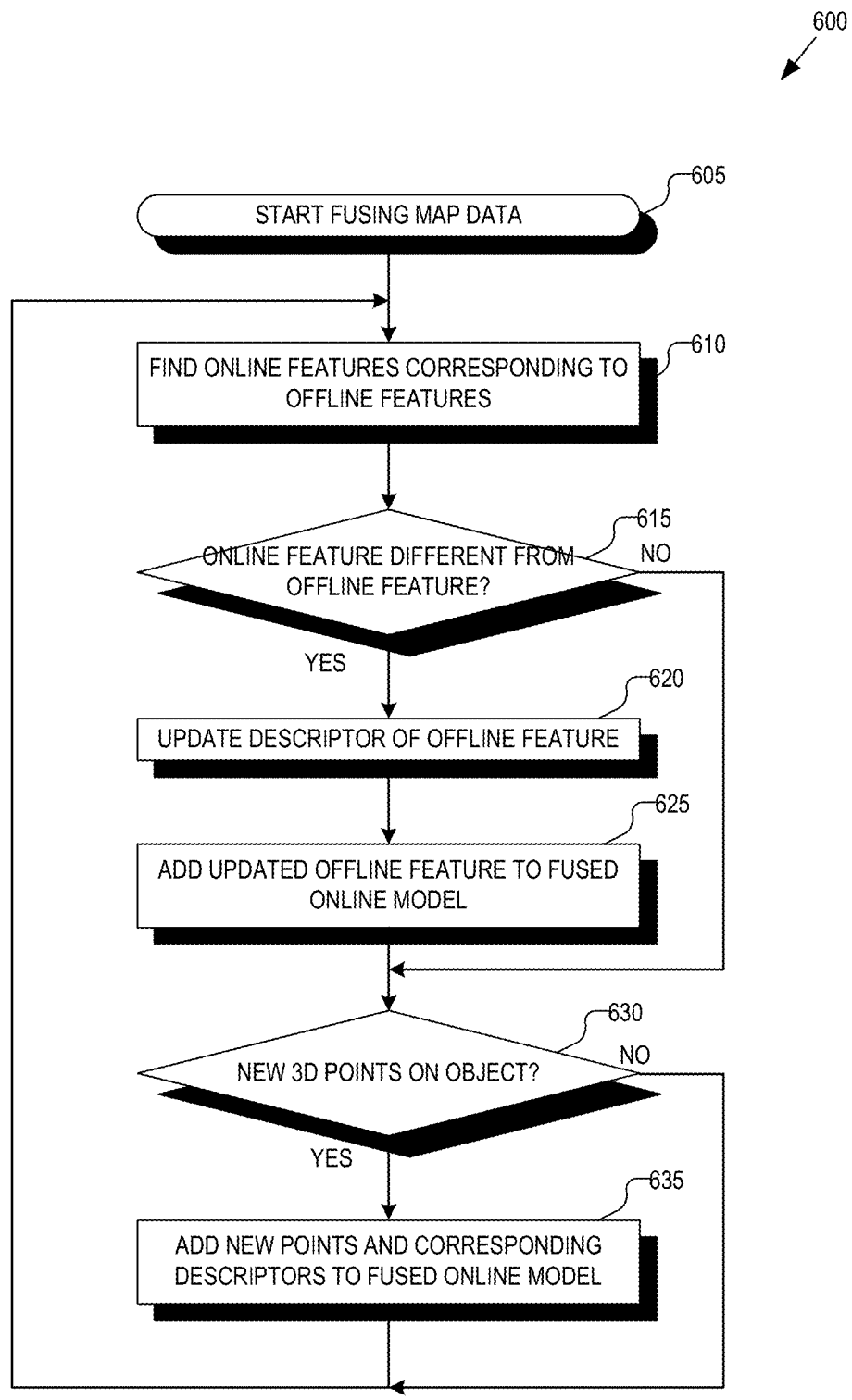
FIG. 6 is a flowchart illustrating a process of fusing online map data with offline map data.

FIG. 6 is a flowchart illustrating a process 600 of fusing online map data with offline map data. Process 600 will be described with reference to FIGS. 5 and 6. Process 600 is one possible implementation of process block 140 of FIG. 1C. Process 600 begins at process block 605 which assumes that the target object has already been detected and that one or more features have been extracted from the recently obtained image(s). In process block 610, extracted online features are found which correspond to the features included in the previously built offline map data. In one embodiment, a 3D point in the offline map is projected onto a current image (i.e., at runtime) of the target object. Then, the online map data is searched to find online features that are close to the location of the projected offline 3D point. In one example, an online feature is close to the projected offline 3D point if the distance between a location of the online feature and the location of the projected offline 3D point is less than a threshold distance.

Decision block 615 then compares the online features with their corresponding offline features. In one embodiment, comparison of the online features with offline features includes comparison of their feature descriptors. If the descriptors are different, the process 600 advances to process blocks 620 and 625, where the offline feature is updated with the descriptor of the online feature (620) and where the updated offline feature is added to the fused online model. If, however, in decision block 615, it is determined that the online feature is not different from its corresponding offline feature, the process 600 may skip process blocks 620 and 625 and proceed directly to decision block 630.

In decision block 630, it is determined whether any of the online features extracted from the current image(s) include any new 3D points that are on the target object. If so, process block 635 includes adding the new online features (i.e., the new 3D points and their corresponding descriptors) to the fused online model. Process 600 may then optionally return to process block 610 for continually updating the fused online model as subsequent images of the target object are obtained.

Although FIG. 6 illustrates a linear progression through process 600, in one embodiment, two or more of the illustrated process blocks may be executed in parallel with one another. For example, blocks 630 and 635 of finding new 3D points and adding those new features to the fused online model may be done in parallel with blocks 610-625, such that process 600 includes the simultaneous updating of offline features while also adding newly detected online features to the fused online model.

Figure 7:
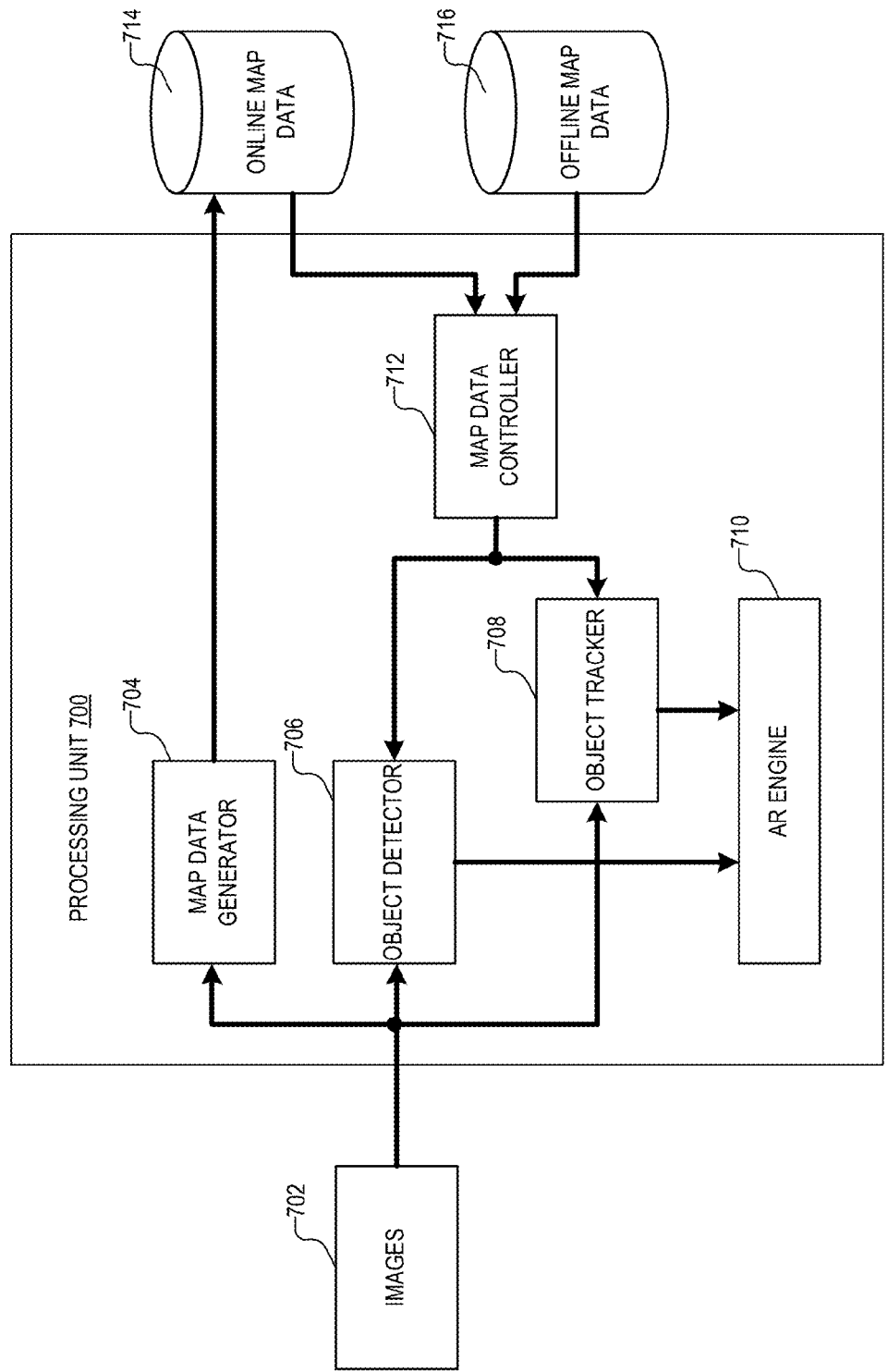
FIG. 7 is a functional block diagram of a processing unit for the dynamic extension of map data.

FIG. 7 is a functional block diagram of a processing unit 700 for the dynamic extension of map data. In one embodiment, processing unit 700, under direction of program code, may perform processes 110, 200, 300, 400 and/or 600, discussed above. For example, a temporal sequence of images 702 are received by the processing unit 700. Object detector 706 detects a target object included in at least one of the images and object tracker 708 tracks the object based on the sequence of images 702. As the images are acquired, map data generator 704 may add select keyframes to the online map data 714 (e.g., see process 200). Object detector 706 and object tracker 708 may determine the current pose of a camera relative to a target object based on the received images and on map data received by map data controller 712. As discussed above, if the target object can neither be tracked nor re-detected then map data controller 712 may provide both online and offline map data to the detector 706 and tracker 708. However, typically the map data controller 712 selects and forwards only one of online and offline map data to the detector and tracker, based on the size of the object in the image frame. In an alternative embodiment, map data controller 712 fuses the online map data 714 with the offline map data 716, as discussed above with reference to process 600. In this embodiment, map data controller provides object tracker 708 with the fused online model for tracking the target object. Augmented Reality (AR) engine may perform any operations related to augmented reality based on the camera pose determined by object detector 706 and/or object tracker 708.

Figure 8:
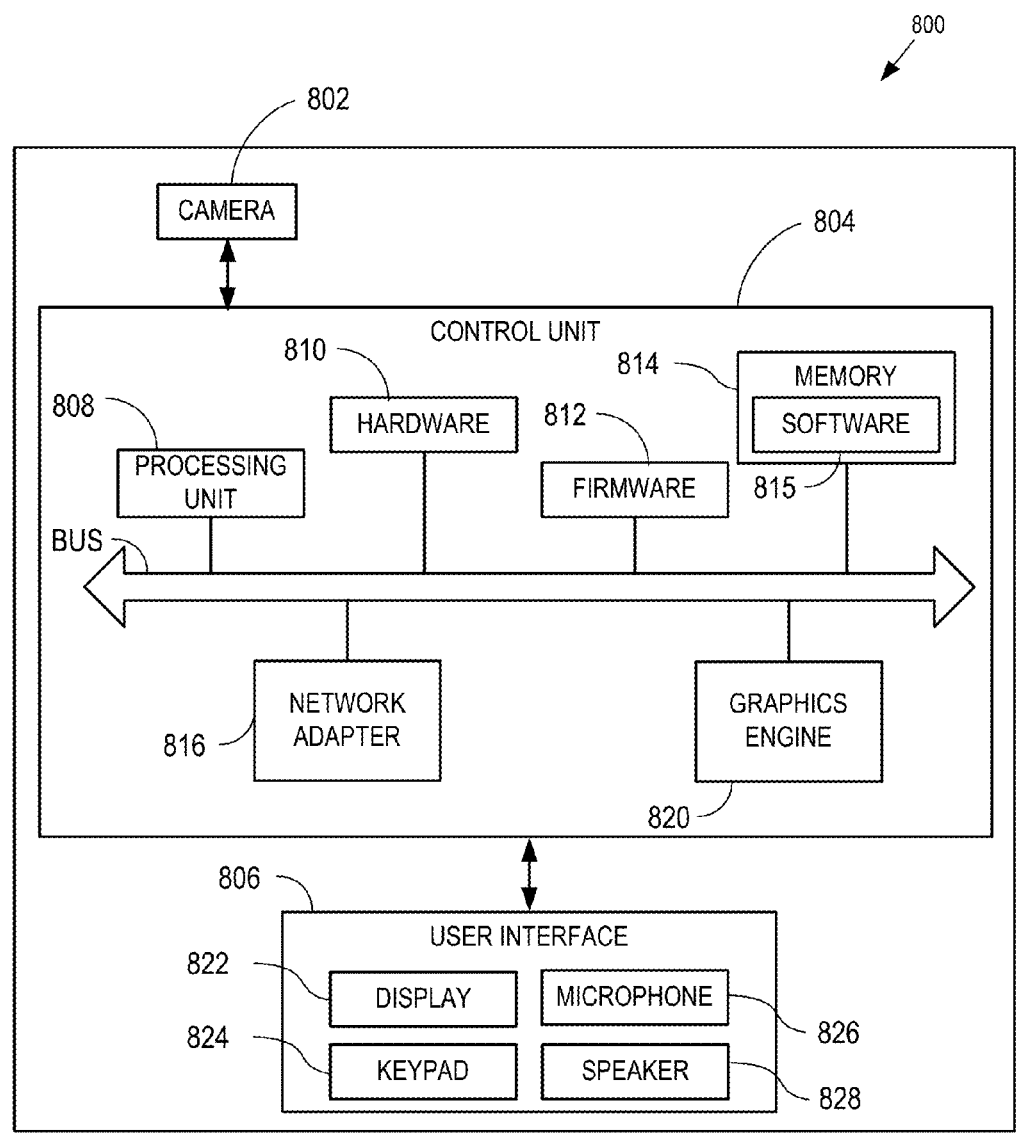
FIG. 8 is a functional block diagram of a mobile platform capable of performing the processes discussed herein.

FIG. 8 is a functional block diagram of a mobile platform 800 capable of performing the processes discussed herein. As used herein, a mobile platform refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. In addition a "mobile platform" may also include all electronic devices which are capable of augmented reality (AR), virtual reality (VR), and/or mixed reality (MR) applications. Any operable combination of the above are also considered a "mobile platform."

Mobile platform 800 may optionally include a camera 802 as well as an optional user interface 806 that includes the display 822 capable of displaying images captured by the camera 802. User interface 806 may also include a keypad 824 or other input device through which the user can input information into the mobile platform 800. If desired, the keypad 824 may be obviated by integrating a virtual keypad into the display 822 with a touch sensor. User interface 806 may also include a microphone 826 and speaker 828.

Mobile platform 800 also includes a control unit 804 that is connected to and communicates with the camera 802 and user interface 806, if present. The control unit 804 accepts and processes images received from the camera 802 and/or from network adapter 816. Control unit 804 may be provided by a processing unit 808 and associated memory 814, hardware 810, software 815, and firmware 812.

Processing unit 700 of FIG. 7 is one possible implementation of processing unit 808 for extending map data, as discussed above. Control unit 804 may further include a graphics engine 820, which may be, e.g., a gaming engine, to render desired data in the display 822, if desired. Processing unit 808 and graphics engine 820 are illustrated separately for clarity, but may be a single unit and/or implemented in the processing unit 808 based on instructions in the software 815 which is run in the processing unit 808. Processing unit 808, as well as the graphics engine 820 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with mobile platform 800, and is not to be limited to any particular type of memory or number of memories, or type of media upon which memory is stored.

The processes described herein may be implemented by various means depending upon the application. For example, these processes may be implemented in hardware 810, firmware 812, software 815, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 815 and executed by the processing unit 808. Memory may be implemented within or external to the processing unit 808.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
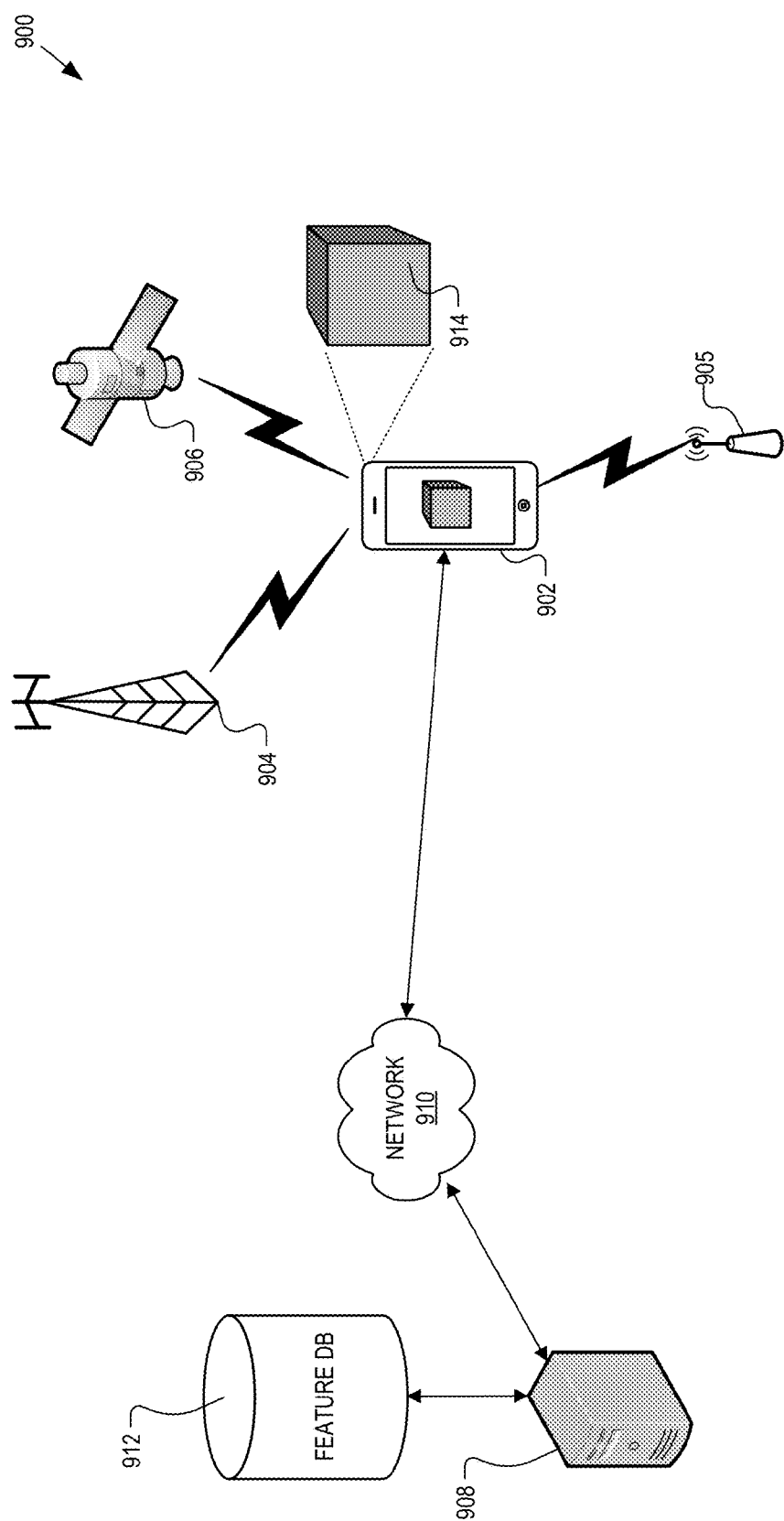
FIG. 9 is a functional block diagram of an object recognition system.

FIG. 9 is a functional block diagram of an object recognition system 900. As shown, object recognition system 900 includes an example mobile platform 902 that includes a camera (not shown in current view) capable of capturing images of a scene including object 914. Feature database 912 may include any of the aforementioned map data, including online and offline map data.

The mobile platform 902 may include a display to show images captured by the camera. The mobile platform 902 may also be used for navigation based on, e.g., determining its latitude and longitude using signals from a satellite positioning system (SPS), which includes satellite vehicle(s) 906, or any other appropriate source for determining position including cellular tower(s) 904 or wireless communication access points 905. The mobile platform 902 may also include orientation sensors, such as a digital compass, accelerometers or gyroscopes, that can be used to determine the orientation of the mobile platform 902.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs) 906. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile platform 902 is not limited to use with an SPS for position determination, as position determination techniques may be implemented in conjunction with various wireless communication networks, including cellular towers 904 and from wireless communication access points 905, such as a wireless wide area network (WWAN), a wireless local area network (WLAN), a wireless personal area network (WPAN). Further the mobile platform 902 may access one or more servers 908 to obtain data, such as online and/or offline map data from a database 912, using various wireless communication networks via cellular towers 904 and from wireless communication access points 905, or using satellite vehicles 906 if desired. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

As shown in FIG. 9, system 900 includes mobile platform 902 capturing an image of object 914 to be detected and tracked based on the map data included in feature database 912. As illustrated, the mobile platform 902 may access a network 910, such as a wireless wide area network (WWAN), e.g., via cellular tower 904 or wireless communication access point 905, which is coupled to a server 908, which is connected to database 912 that stores information related to target objects and their images. While FIG. 9 shows one server 908, it should be understood that multiple servers may be used, as well as multiple databases 912. Mobile platform 902 may perform the object detection and tracking itself, as illustrated in FIG. 9, by obtaining at least a portion of the database 912 from server 908 and storing the downloaded map data in a local database inside the mobile platform 902. The portion of a database obtained from server 908 may be based on the mobile platform's geographic location as determined by the mobile platform's positioning system. Moreover, the portion of the database obtained from server 908 may depend upon the particular application that requires the database on the mobile platform 902. The mobile platform 902 may extract features from a captured query image, and match the query features to features that are stored in the local database. The query image may be an image in the preview frame from the camera or an image captured by the camera, or a frame extracted from a video sequence. The object detection may be based, at least in part, on determined confidence levels for each query feature, which can then be used in outlier removal. By downloading a small portion of the database 912 based on the mobile platform's geographic location and performing the object detection on the mobile platform 902, network latency issues may be avoided and the over the air (OTA) bandwidth usage is reduced along with memory requirements on the client (i.e., mobile platform) side. If desired, however, the object detection and tracking may be performed by the server 908 (or other server), where either the query image itself or the extracted features from the query image are provided to the server 908 by the mobile platform 902. In one embodiment, online map data is stored locally by mobile platform 902, while offline map data is stored in the cloud in database 912.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method of tracking a target object in an object recognition system, the method comprising:
   acquiring a plurality of images with a camera;
   acquiring offline map data of the target object; and
   simultaneously tracking the target object and dynamically building online map data from the plurality of images, wherein tracking the target object includes selecting between the online map data and the offline map data for tracking the target object based at least in part on a size of the target object relative to an image in which the target object is being tracked.

2. The computer-implemented method of claim 1, wherein tracking the target object includes:
   estimating a target pose of the target object with respect to the camera, wherein the target pose estimation may be successful or unsuccessful;
   determining whether the target pose estimation is successful; and if so, enabling only one of the online map data and offline map data for tracking of the target object in a subsequent image.

3. The computer-implemented method of claim 2, further comprising enabling both online map data and offline map data, if the tracking of the target object is not successful, for tracking of the target object in the subsequent image.

4. The computer-implemented method of claim 2, wherein enabling only one of the online map data and the offline map data includes:
   computing a region size of the target object;
   enabling the offline map data and disabling the online map data if the region size of the target object is greater than a region threshold; and
   enabling the online map data and disabling the offline map data if the region size of the target object is not greater than the region threshold.

5. The computer-implemented method of claim 4, wherein computing the region size of the target object includes projecting a bounding box of offline map data features onto an acquired image.

6. The computer-implemented method of claim 4, wherein the region threshold corresponds to the target object assuming at least half of an image.

7. The computer-implemented method of claim 1, wherein the online map data is based on one or more keyframes corresponding with the plurality of images acquired with the camera.

8. The computer-implemented method of claim 1, wherein building the online map data includes keyframe Simultaneous Localization and Mapping (SLAM).

9. The computer-implemented method of claim 1, wherein building the online map data includes adding a candidate keyframe to one or more keyframes by computing a pose distance between the candidate keyframe and other online keyframes corresponding to images acquired by the camera.

10. The computer-implemented method of claim 1, further comprising fusing the online map data with the offline map data to generate a fused online model of the target object and wherein tracking of the target object uses the fused online model when online map data is selected for tracking the target object.

11. The computer-implemented method of claim 10, further comprising fusing the online map data with the offline map data including:
   extracting one or more online features from at least one of the plurality of acquired images;
   comparing an online feature with offline features included in the offline map data;
   updating a descriptor of an offline feature and adding the updated offline feature to the fused online model if both the online feature and the offline feature correspond to a same 3D point of the target object; and
   adding the online feature to the fused online model if the online feature corresponds to a new 3D point on the target object, where the new 3D point does not correspond to any offline feature.

12. A non-transitory computer-readable medium including program code stored thereon for tracking a target object in an object recognition system, the program code comprising instructions to:
   acquire a plurality of images with a camera;
   acquire offline map data of the target object; and
   simultaneously track the target object and dynamically building online map data from the plurality of images, wherein the instruction to track the target object includes instruction to select between the online map data and the offline map data for tracking the target object based at least in part on a size of the target object relative to an image in which the target object is being tracked.

13. The non-transitory computer-readable medium of claim 12, wherein the instructions to track the target object includes instructions to:
   estimate a target pose of the target object with respect to the camera, wherein the target pose estimation may be successful or unsuccessful;
   determine whether the target pose estimation is successful; and if so,
   enable only one of the online map data and offline map data for tracking of the target object in a subsequent image.

14. The non-transitory computer-readable medium of claim 13, further comprising instructions to enable both online map data and offline map data if the tracking of the target object is not successful for tracking of the target object in the subsequent image.

15. The non-transitory computer-readable medium of claim 13, wherein enabling only one of the online map data and the offline map data includes instructions to:
   compute a region size of the target object;
   enable the offline map data and disabling the online map data if the region size of the target object is greater than a region threshold; and
   enable the online map data and disable the offline map data if the region size of the target object is not greater than the region threshold.

16. The non-transitory computer-readable medium of claim 15, wherein the instructions to compute the region size of the target object includes instructions to project a bounding box of offline map data features onto an acquired image.

17. The non-transitory computer-readable medium of claim 15, wherein the region threshold corresponds to the target object assuming at least half of an image.

18. The non-transitory computer-readable medium of claim 12, wherein the online map data is based on one or more keyframes corresponding with the plurality of images acquired with the camera.

19. The non-transitory computer-readable medium of claim 12, wherein the instructions to build the online map data includes keyframe Simultaneous Localization and Mapping (SLAM).

20. The non-transitory computer-readable medium of claim 12, wherein the instructions to build the online map data includes instructions to add a candidate keyframe to one or more keyframes by computing a pose distance between the candidate keyframe and other online keyframes corresponding to images acquired by the camera.

21. The non-transitory computer-readable medium of claim 12, further comprising instructions to fuse the online map data with the offline map data to generate a fused online model of the target object and wherein tracking of the target object uses the fused online model when online map data is selected for tracking the target object.

22. The non-transitory computer-readable medium of claim 21, further comprising instructions to fuse the online map data with the offline map data including instructions to:
   extract one or more online features from at least one of the plurality of acquired images;
   compare the one or more online features with offline features included in the offline map data;
   update a descriptor of an offline feature and add the updated offline feature to the fused online model if both the online feature and the offline feature correspond to a same 3D point of the target object; and
add the online feature to the fused online model if the online feature corresponds to a new 3D point on the target object, where the new 3D point does not correspond to any offline feature.

23. An apparatus, comprising:
memory adapted to store program code for tracking a target object in an object recognition system; and
one or more processors adapted to access and execute instructions included in the program code, wherein when the instructions are executed by the one or more processors, the one or more processors direct the apparatus to:
acquire a plurality of images with a camera;
acquire offline map data of the target object; and
simultaneously track the target object and dynamically building online map data from the plurality of images, wherein the instruction to track the target object includes instructions to select between the online map data and the offline map data for tracking the target object based at least in part on a size of the target object relative to an image in which the target object is being tracked.

24. The apparatus of claim 23, wherein the instructions to track the target object includes instructions to:
estimate a target pose of the target object with respect to the camera, wherein the target pose estimation may be successful or unsuccessful;
determine whether the target object pose estimation is successful; and if so,
enable only one of the online map data and offline map data for tracking of the target object in a subsequent image.

25. The apparatus of claim 24, wherein enabling only one of the online map data and the offline map data includes instructions to:
compute a region size of the target object;
enable the offline map data and disabling the online map data if the region size of the target object is greater than a region threshold; and
enable the online map data and disable the offline map data if the region size of the target object is not greater than the region threshold.

26. The apparatus of claim 23, further comprising instructions to fuse the online map data with the offline map data to generate a fused online model of the target object and wherein tracking of the target object uses the fused online model when online map data is selected for tracking the target object.

27. The apparatus of claim 26, further comprising instructions to fuse the online map data with the offline map data including instructions to:

extract one or more online features from at least one of the plurality of acquired images;
compare the one or more online features with offline features included in the offline map data;
update a descriptor of an offline feature and add the updated offline feature to the fused online model if both the online feature and the offline feature correspond to a same 3D point of the target object; and
add the online feature to the fused online model if the online feature corresponds to a new 3D point on the target object, where the new 3D point does not correspond to any offline feature.

28. An apparatus, comprising:
means for acquiring a plurality of images with a camera;
means for acquiring offline map data of the target object; and
means for simultaneously tracking the target object and dynamically building online map data from the plurality of images, wherein means for tracking the target object includes means for selecting between the online map data and the offline map data for tracking the target object based at least in part on a size of the target object relative to an image in which the target object is being tracked.

29. The apparatus of claim 28, further comprising means for fusing the online map data with the offline map data to generate a fused online model of the target object including:
means for extracting one or more online features from at least one of the plurality of acquired images;
means for comparing the one or more online features with offline features included in the offline map data;
means for updating a descriptor of an offline feature and adding the updated offline feature to the fused online model if both the online feature and the offline feature correspond to a same 3D point of the target object; and
means for adding the online feature to the fused online model if the online feature corresponds to a new 3D point on the target object, where the new 3D point does not correspond to any offline feature.

30. The apparatus of claim 28, wherein the means for tracking the target object includes:
means for estimating a target pose of the target object with respect to the camera, wherein the target pose estimation may be successful or unsuccessful;
means for determining whether the target pose estimation is successful; and
means for enabling only one of the online map data and offline map data for tracking of the target object in a subsequent image if tracking of the target object is successful.

* * * * *